United States Patent [19]
Hwang

[11] Patent Number: 5,921,646
[45] Date of Patent: Jul. 13, 1999

[54] COMBINATION OF EASILY ASSEMBLABLE AND MOVABLE CABINET WITH ITS ENGAGEMENT COMPONENTS

[75] Inventor: James Hwang, Taipei, Taiwan

[73] Assignee: Kenmark Industrial, Co., Ltd., Taipei, Taiwan

[21] Appl. No.: 08/898,595

[22] Filed: Jul. 22, 1997

[51] Int. Cl.⁶ .................................................. A47B 47/00
[52] U.S. Cl. ..................... 312/263; 312/265.5; 312/249.8
[58] Field of Search ................................ 312/263, 249.1, 312/249.8, 257.1, 265.5, 326, 111

[56] References Cited

U.S. PATENT DOCUMENTS

| | | | |
|---|---|---|---|
| 5,249,857 | 10/1993 | Suzuki | 312/249.8 X |
| 5,372,415 | 12/1994 | Tisbo et al. | 312/263 X |
| 5,382,088 | 1/1995 | Young | 312/265.5 X |
| 5,466,058 | 11/1995 | Chan | 312/263 X |
| 5,527,103 | 6/1996 | Pittman | 312/265.5 X |

*Primary Examiner*—Peter M. Cuomo
*Assistant Examiner*—James O. Hansen
*Attorney, Agent, or Firm*—Bacon & Thomas

[57] ABSTRACT

A movable storage cabinet includes a base plate, two lateral side plates fixed to the based plate by hooks provided at the bottom of the side plates, a rear backing plate which is held in a groove in the base plate, and a top plate fixed to the side and rear backing plate by engagement components extending through holes in the top plate to engage engaging stubs on the side plates and rear backing plate. A pivotable door closes the front of the movable storage cabinet. The engaging components include each includes an engaging stub in the shape of a hollow cylinder, the bottom of which is secured to the top plate, and a shank of which is inserted into the central hole of an engaging stub on one of the side or backing plates. A positioning rod is insertable through the central hole in the outer sleeve of the hollow cylinder to lock the engaging stub within the outer sleeve, thereby locking the top plate to the side or backing plates.

4 Claims, 11 Drawing Sheets

COMBINATION OF EASILY ASSEMBLABLE AND MOVABLE CABINET WITH ITS ENGAGEMENT COMPONENTS

BACKGROUND OF THE INVENTION

1. Field of the Invention

The present invention is related to a combined structure of an easily assemblable and movable storage cabinet with its engagement components, and is provided for easy assembling of the movable storage cabinet and reduction in its cost of production, assembly time and volume in storing and shipping.

2. Description of the Prior Art

A movable storage cabinet is normally used to house electrical appliances such as a TV set, a video cassette recorder/player or a hi-fi set in a house. The conventional structure of a movable storage cabinet, as shown in FIG. 1, includes a base plate 1, a rear backing plate 2, two lateral side plates 3, a top plate 4 and two door panels 5. In which. The base plate 1 is laid down on the ground with rollers 6 on the bottom thereof, so that the movable storage cabinet can slide by rolling of the rollers 6. The rear backing plate 2 and the two lateral side plates 3 are located upright respectively on the rear and the two lateral sides of the base plate 1. The top plate 4 has an area approximately equal to that of the base plate 1 and covers the tops of the rear backing plate 2 and the two lateral side plates 3. An opened receiving space 7 is formed by the base plate 1, the top plate 4, the rear backing plate 2 and the two lateral side plates 3, in order to hold therein a video cassette recorder/player, the main machine of a hi-fi set, an amplifier, cassette tapes, videotapes or CDs etc. A TV set can be placed on the top of the top plate 4. Door panels 5 are provided in front of the receiving space 7 for opening or closing the receiving space 7.

The above mentioned conventional structure of a movable storage cabinet is convenient in use, but, it has quite a lot of defects in production, assembling, storing as well as shipping, so that its cost can not be lowered, and customers are not inclined to buy durable ones of them without cheap prices. The principal reason for the defects of the conventional movable storage cabinets is that, the structure thereof is limited to the conventional assembling mode, i.e., the members including the base plate 1, the rear backing plate 2, the two lateral side plates 3, the top plate 4 and the door panels 5 are all made by connecting and fixing them with nails, iron sheets, conventional screws, rivets etc., and can not be detached once they are assembled and fixed. To manufacturer, this will induce troubles such as too slow assembling speed, time wasting, too large volume of the assembled cabinet, wasting of storing space and inconvenience in shipping, all of which can increase the cost of production and in turn the selling prices, and yet customers are unable to take the cabinets home by themselves, inducing shipping charges, and further increasing expense of the customers. In view of these problems, the structure of the conventional movable storage cabinets needs to be improved.

SUMMARY OF THE INVENTION

In view of this, the inventor of the present invention provides a combination of an easily assemblable and movable storage cabinet and its engagement components based on his professional experience of years in manufacturing and selling similar products and after continuous study and improvement.

Particularly, the combined structure of the easily assemblable and movable storage cabinet of the present invention is comprised of two portions:

a. A movable storage cabinet portion, having therein:
   a base plate, the two lateral sides of the top surface thereof including positioning holes, the rear side thereof including a transverse groove, the two ends of the front side thereof being drilled to have a pair of lower axle holes;
   two lateral side plates located upright respectively at the two lateral sides on the base plate, two downwardly bent hooks being provided thereon corresponding in position to the above mentioned positioning holes for engagement and fixing therewith, a vertical groove being provided on the rear end of each side plate located above the above mentioned transverse groove, a plurality of engaging stubs being provided on the tops thereof;
   a rear backing plate having two lateral ends for engaging in the vertical grooves of the two lateral side plates, the bottom edge thereof being inserted in the transverse groove of the base plate to secure the rear backing plate to the base plate,
   a top plate covering the tops of the rear backing plate and the two lateral side plates, a pair of upper axle holes being provided thereon in correspondence with the above mentioned lower axle holes, and a plurality of through holes corresponding to the above mentioned engaging stubs; and
   two door panels provided at the two lateral ends of the front edges of and between the top plate and the base plate to cover the area in front of the two lateral side plates, a plurality of protruding axles being provided in corresponding to the upper and lower axle holes, so that the door panels are pivotally mounted for opening or closing.

b. An engaging component portion:
   an engaging stub in the shape of a hollow cylinder, the bottom of which is secured on a first object to be engaged with, the top end thereof being aligned with a through hole provided on a second object to be engaged with, the central hole thereof being enlarged at the lower portion thereof;
   an outer sleeve in the shape of a hollow cylinder with a central hole, the shank thereof being inserted into the central hole of the engaging stub, the tailing end thereof being a claw which is extended to the enlarged lower portion of the central hole of the engaging stub, the claw being in the form of a hollow cone with a plurality of gaps cut on the periphery thereof to allow the claw to stretch or collapse elastically, the upper end of the claw being slightly protruded externally to have a slightly larger diameter than the inner diameter of the engaging stub, the outer sleeve being provided on its top an enlarged portion having a diameter larger than that of the through hole, a top round recess being formed therein, and the bottom of the round recess being provided with a plurality of bevelled blocks separately arrayed around the central through hole;
   a positioning rod having a length longer than that of the outer sleeve and being insertable into the central through hole of the outer sleeve, the trailing end thereof being provided with a neck with a smaller diameter, a cone being provided on the end of the neck, the diameter of the upper end of the cone being larger than the inner diameter of the bottom end of the claw, the top end of the positioning rod being provided with a pressing member of which the bottom end can be extended into the round recess, and the bottom end of the pressing member being provided with a plurality of guiding blocks opposite to the bevelled blocks. When the positioning rod is extended into the central through hole of the outer sleeve and the pressing member is pressed down, so that the bottom ends of the guiding blocks abut against the bottom of the round recess, the neck and the cone being extend out of the bottom end of the claw of the outer sleeve and the end of the positioning rod contacts the inner bottom end of the claw. In this way, the claw is pushed outwardly slightly to prevent it from contracting, causing, the outer sleeve to lock the engaging stub so that it cannot be taken out, and thereby causing, the first and the second objects to be engaged with each other. When the pressing member is pressed with a force to rotate the positioning rod, the guiding blocks are moved upwardly along the top surfaces of the bevelled blocks, and in turn the positioning rod and the pressing member are moved upwardly, at which time the end of the claw of the outer sleeve reaches the neck of the positioning rod having a reduced diameter. The pressing member is then grasped and pulling it upwardly, the end of the claw being abutted against the upper surface of the cone and thus is pulled upwardly together with the positioning rod, the peripheral surface of the claw being pressed by the central hole of the engaging stub, so that the outer sleeve and the positioning rod in the central through hole thereof are drawn upwawdly out of the central hole, and disengagement of the first and the second objects to be engaged with is effected.

In practice, a plurality of engagement components are extended through the through holes from above the top plate and down to engage with the engaging stubs for securing the top plate.

The primary object of the present invention therefore is to provide a combined structure of an easily assemblable and movable storage cabinet with its engagement components, by interconnection structure of the members in the movable storage cabinet and the engagement components thereof so that, no tool is required in assembling of the cabinets with fast speed, saving working hours; and by virtue of the simplicity of assembly, manufacturers do not need to assemble them in antecedent when in storing and shipping, so that their cost can thus be lowered. Customers can do the assembling work by themselves because of the smaller volume and the lower price when they buy the unassembled cabinet components, expense is much saved, and the defects resided in the prior arts can be gotten rid of. In addition, the engagement components can be widely used on other similar household appliances to get the same object of convenience in assembling and use.

The present invention will be apparent in its practical structure and characteristics after reading the detailed description of the preferred embodiment thereof in reference to the accompanying drawings.

DETAILED DESCRIPTION OF THE PREFERRED EMBODIMENT

Figure 1:
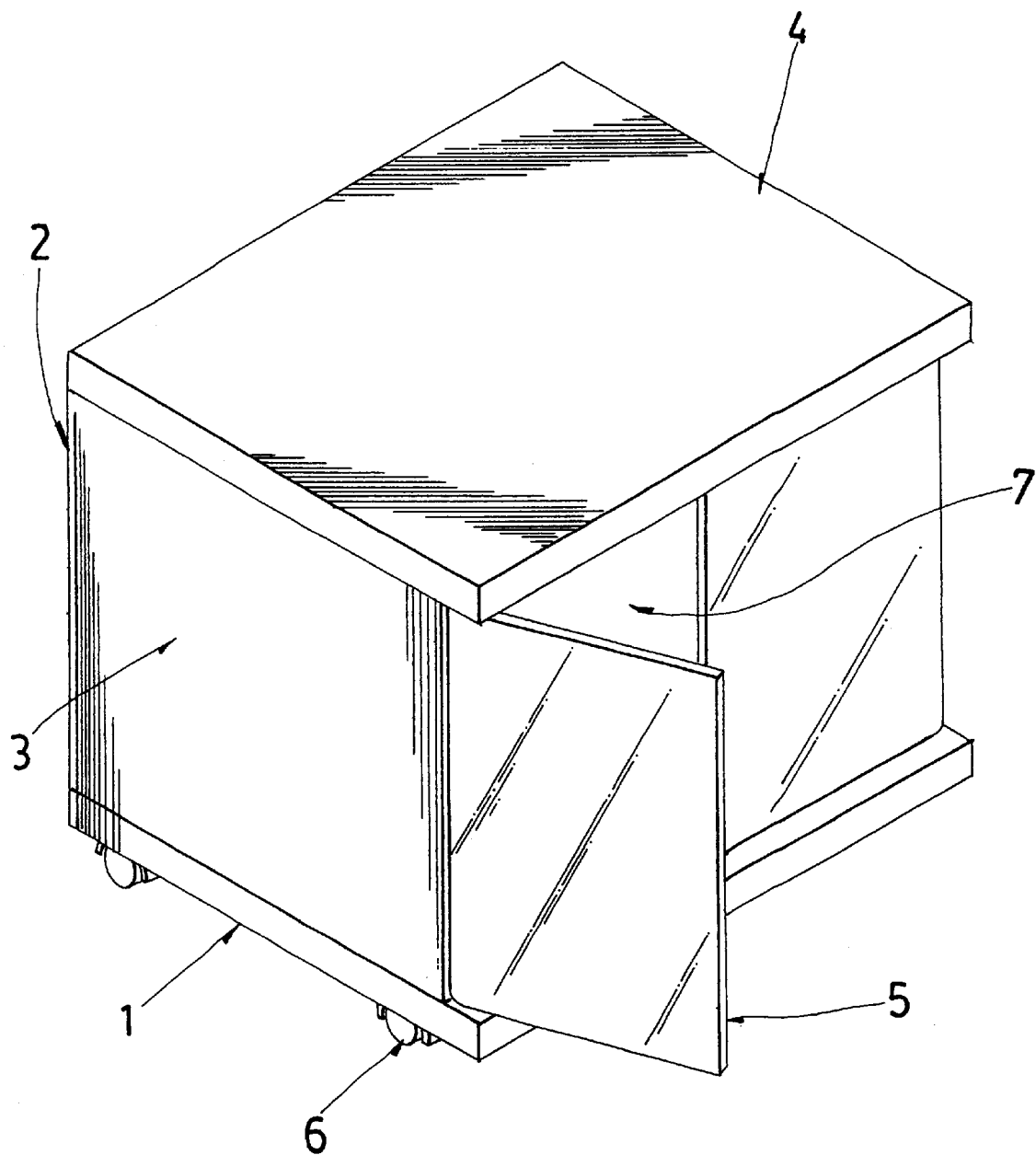
FIG. 1 is a perspective view of a conventional movable storage cabinet.
Figure 2:
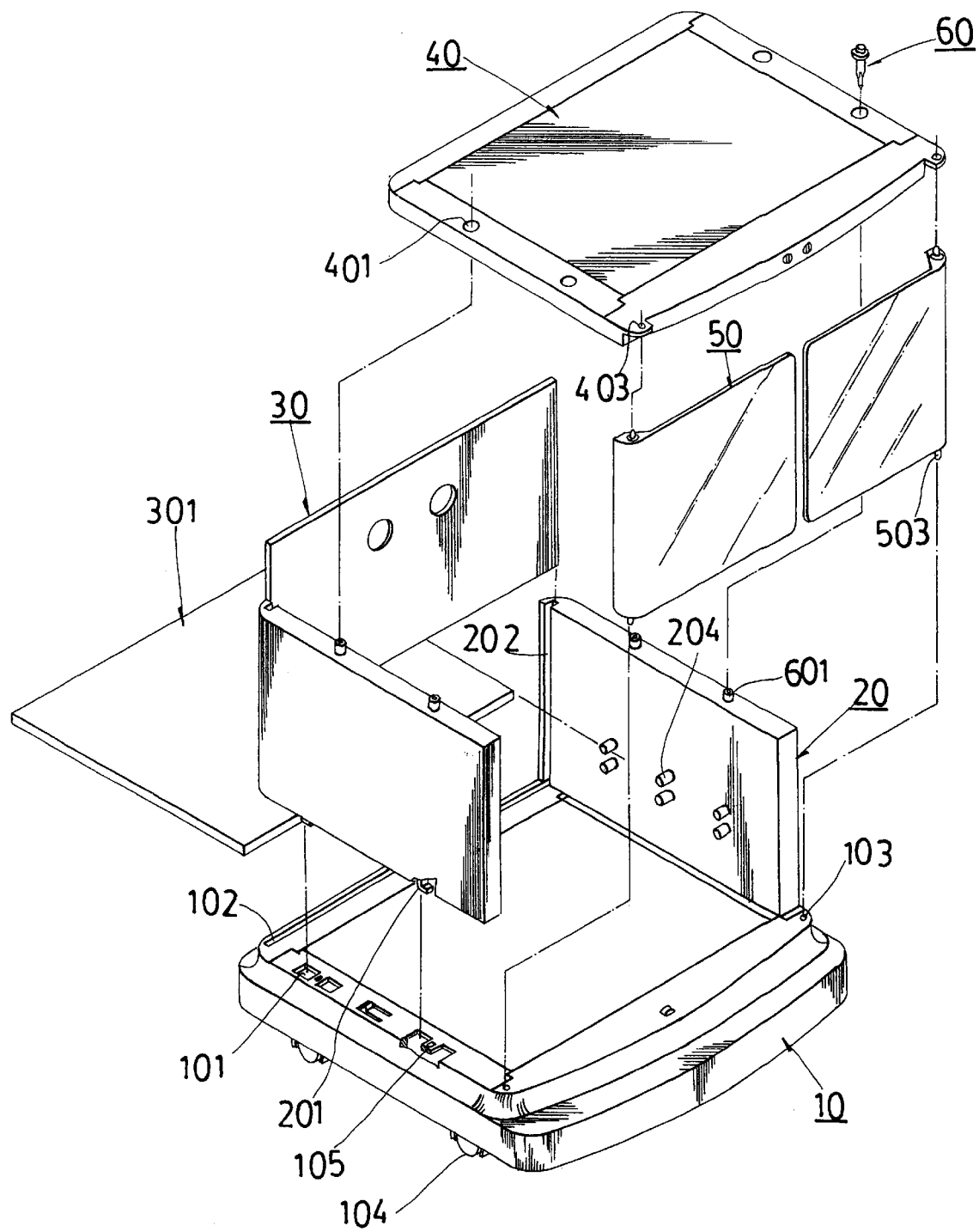
FIG. 2 is an analytic perspective view of the movable storage cabinet of the present invention.

Referring to FIG. 2, the movable storage cabinet in the combination of an easily assemblable and movable storage cabinet and its engagement components is comprised at least of: a base plate 10, two lateral side plates 20, a rear backing plate 30, a top plate 40, two door panels 50 and a plurality of engaging components 60, wherein:

The base plate 10 includes positioning holes two lateral sides of the top surface thereof and a transverse groove 102 in a rear side thereof, the two ends of the front side thereof being drilled to provide two lower axle holes 103, and a plurality of rollers 104 are provided on the bottom thereof.

The lateral side plates 20 are located upright respectively at the two lateral sides on the base plate 10, two bending and L shaped hooks 201 are extended down therefrom and correspond in position to the positioning holes 101 for engagement therewith and fixing thereon, a vertical groove 202 is provided on the rear end of each side plate 20 located above the above mentioned transverse groove 102, and a plurality of engaging stubs 601 of the above mentioned engaging components 60 are provided on the tops thereof.

The rear backing plate 30 has two lateral ends thereof which can be exactly engaged in the vertical grooves 202 of the two lateral side plates 20, so that the bottom edge thereof can be inserted in the transverse groove 102 of the base plate 10 for securing the rear backing plate to the base plate.

The top plate 40 covers the tops of the rear backing plate 30 and the two lateral side plates 20, two upper axle holes 403 are provided thereon in correspondence with the above mentioned lower axle holes 103, and a plurality of through holes 401 are provided corresponding to the above mentioned engaging stubs 601.

The door panels 50 are provided on the two lateral sides in the front of and between the base plate 10 and the top plate 40 and cover the front ends of the two side plates 20. They are provided with protruding axles 503 corresponding in position to the upper and lower axle holes 403, 103, so that the door panels 50 can be pivotally opened or closed.

The engaging components 60 include the above mentioned engaging stubs 601 provided on the top of the two lateral side plates 20, and can be engaged with the engaging stubs 601 provided on the top of the two lateral side plates 20 through the through holes 401 from the top of the top plate 40 which can thereby be secured.

Figure 3A:
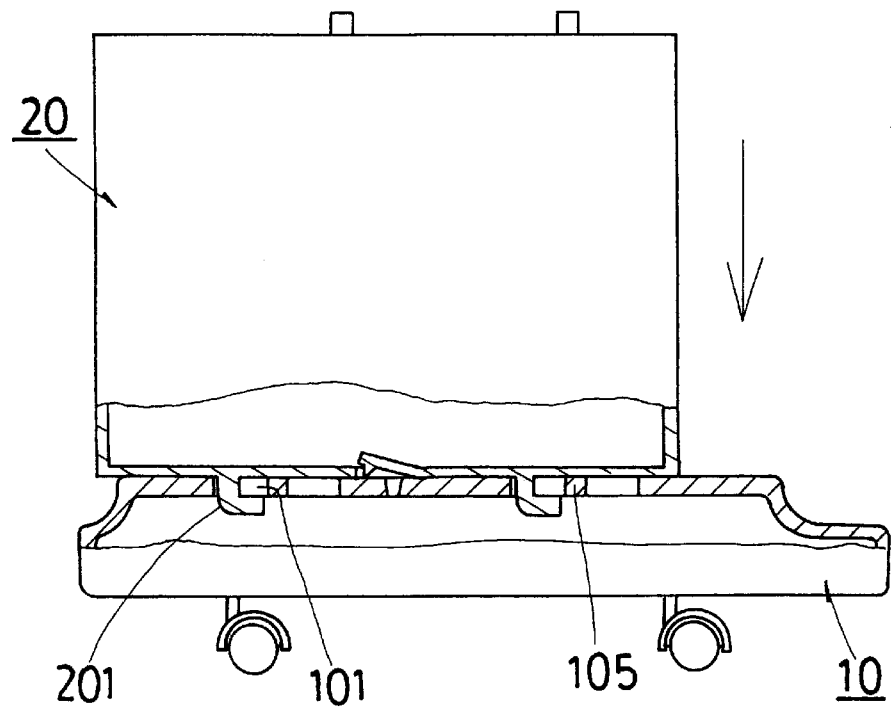
FIG. 3A is a schematic view showing assembling of the lateral side plates and the base plate of the movable storage cabinet of the present invention.
Figure 3B:
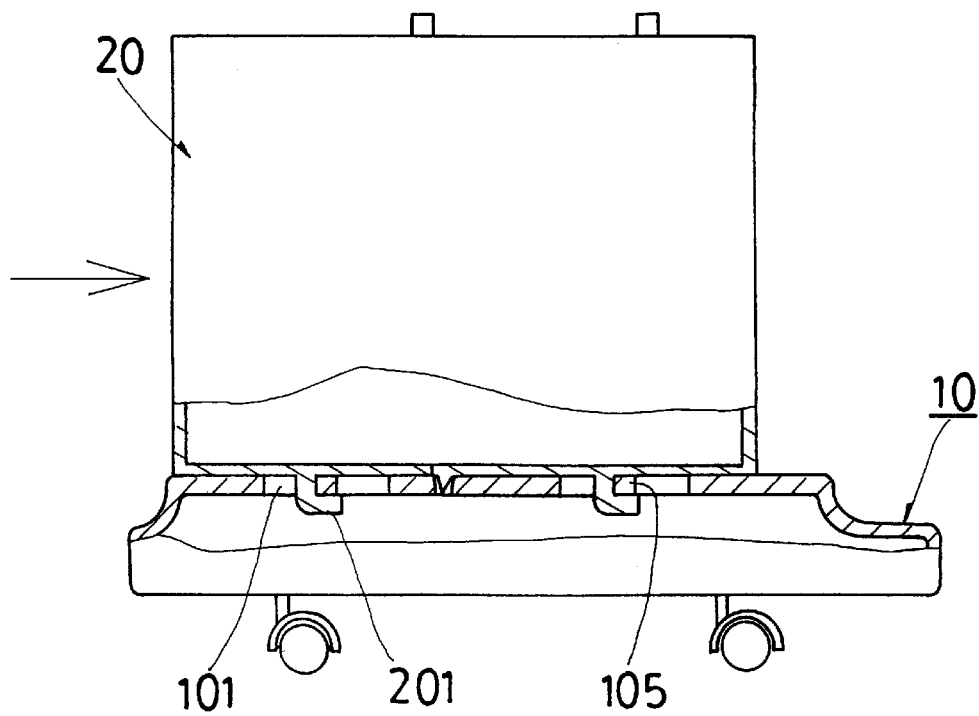
FIG. 3B is a schematic view assembling of the lateral side plates and the base plate of the movable storage cabinet of the present invention after assembling.

Referring to FIG. 3, when the above stated lateral side plates 20 and the base plate 10 are assembled, the thickness of an engaging portion 105 at one lateral side of the positioning holes 101 on the base plate 10 can be slightly larger than the height of the engaging spaces above the hooks 201 of the side plates 20. During assembling, the side plates 20 are placed at the lateral sides of the base plate 10, the hooks 201 are inserted into the positioning holes 101, the side plates 20 are tapped to move them to so as to cause hook 201 to engage the bottom of the thicker engaging portions 105. In this way, the hooks 201 are snugly engaged in the engaging portions 105, and thus assembling of the side plates 20 and the base plate 10 is completed. To detach the side plates the side plates 20 are tapped in the contrary direction to move them and cause the hooks 201 to disengage from the engaging portions 105, so that the hooks 201 are removed from the positioning holes 101 to effect detachment.

Figure 4:
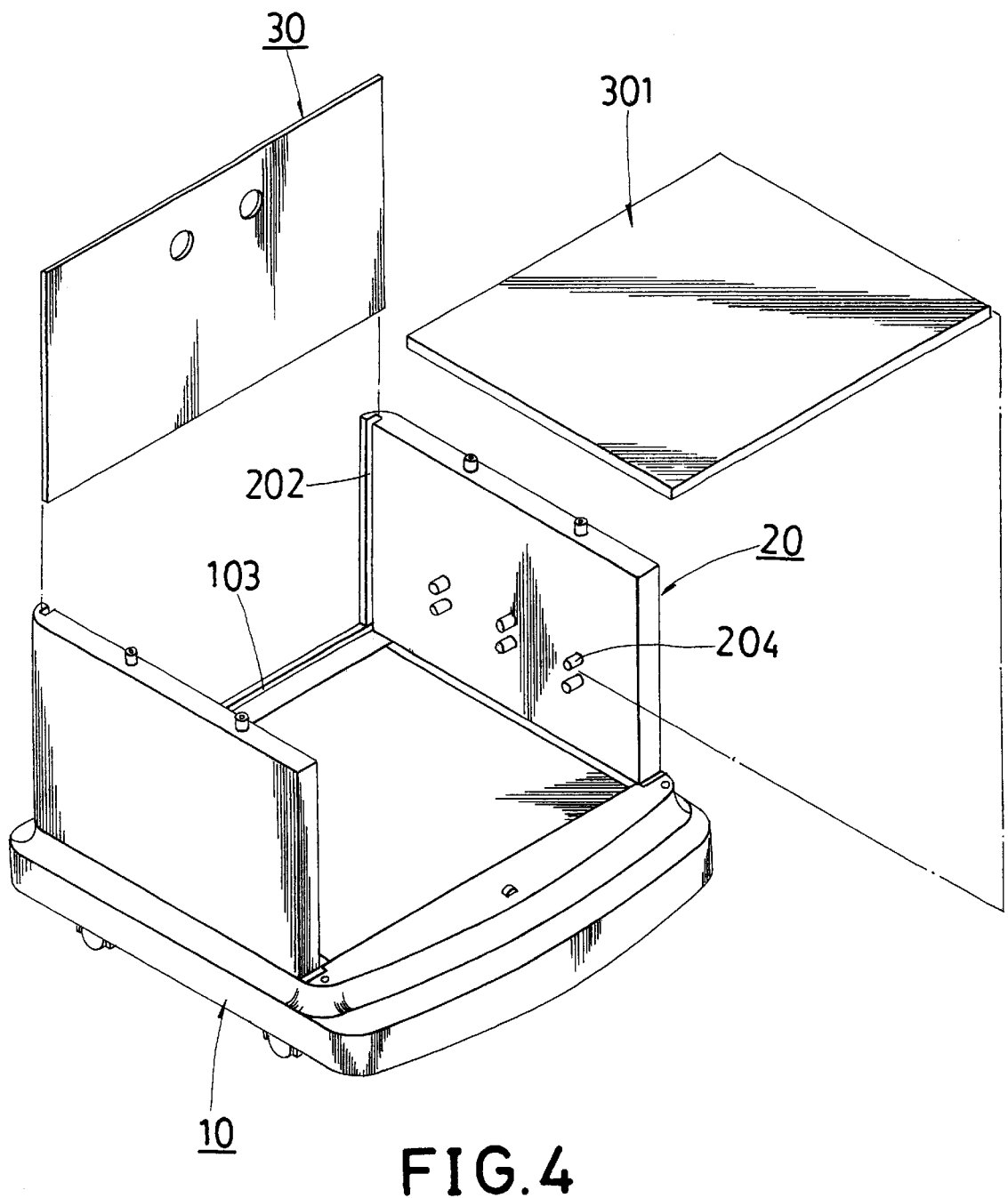
FIG. 4 is a schematic view showing assembling of the rear backing plate and the transverse partitioning plate of the movable storage cabinet of the present invention.

Referring to FIG. 4, when the above mentioned rear backing plate 30 is assembled, both sides thereof can be aligned with the vertical grooves 202 provided on the rear ends of the side plates 20, and are inserted therein from above. The bottom of the rear backing plate 30 is then inserted in the transverse groove 102 of the base plate 10 when it reaches the latter, and thus assembling of the rear backing plate 30 is completed. To detach the rear backing plate the rear backing plate 30 only needs to be drawn upwardly since there is no impediment above it. In practicing of the present invention, a transverse partitioning plate 301 can be provided additionally to divide the space between the two side plates 20 into an upper and a lower areas. The can be effected by providing a plurality of protrusions 204 on the inner surfaces of the side plates 20, the protrusions 204 being arrayed in an upper and a lower lines parallel to each other on both of the side plates 20, so that the transverse partitioning plate 301 can be inserted between them from the front or the rear of the two side plates 20 and is fixed therebetween.

Figure 5:
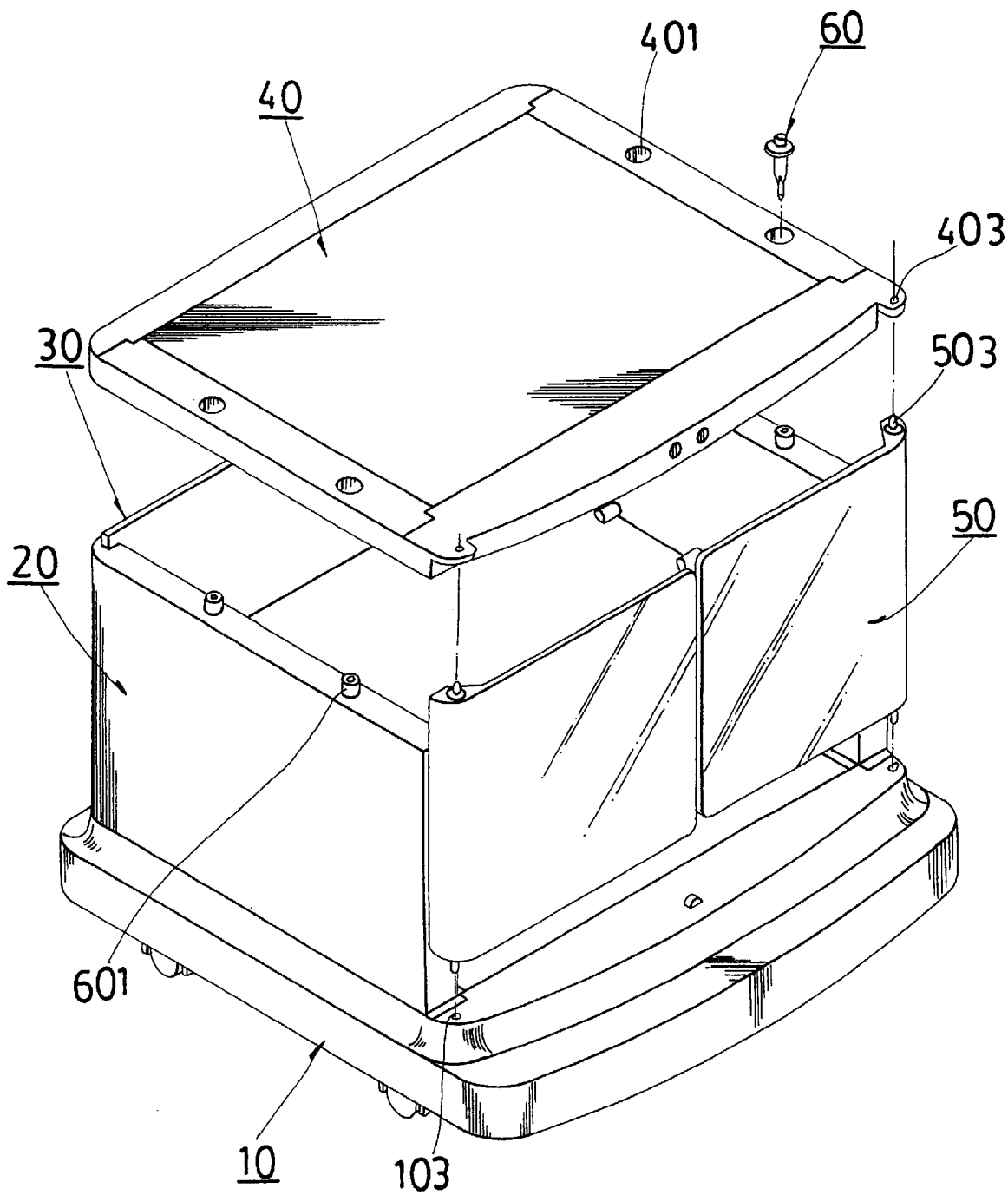
FIG. 5 is a schematic view showing assembling of the top plate and the door panels of the movable storage cabinet of the present invention.

Referring refer to FIG. 5, when the above mentioned top plate 40 and the side plates 20 are assembled, both sides of the top plate 40 are superimposed on the tops of the two side plates 20 to slip the through holes 401 over the engaging stubs 601 and fixed thereon by the whole engaging components 60. The top plate 40 is then secured. To detach the top plate, it is only necessary to release the engagement between the engaging components 60 and the engaging stubs 601. The top plate 40 then can be removed to effect the detachment. The above mentioned door panels 50 are provided with protruding axles 503 corresponding in position to the upper and lower axle holes 403, 103. Hence when assembling, the bottom ends of the protruding axles 503 are inserted in the lower axle holes 103 in the first place before assembling of the top plate 40 and the side plates 20. When the top plate 40 are superimposed on the side plates 20, the top ends of the protruding axles 503 are inserted in the upper axle holes 403, thus completing assembling of the door panels 50.

Figure 6:
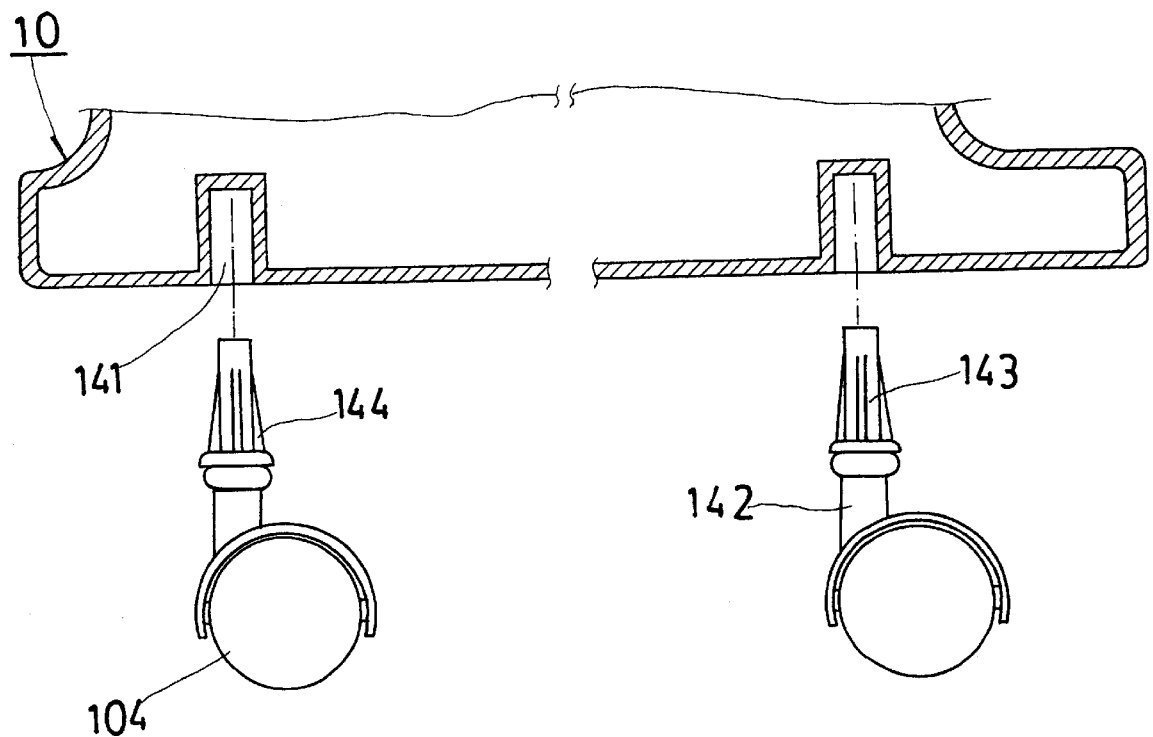
FIG. 6 is a schematic view showing assembling of the base plate and the rollers of the movable storage cabinet of the present invention.
Figure 7:
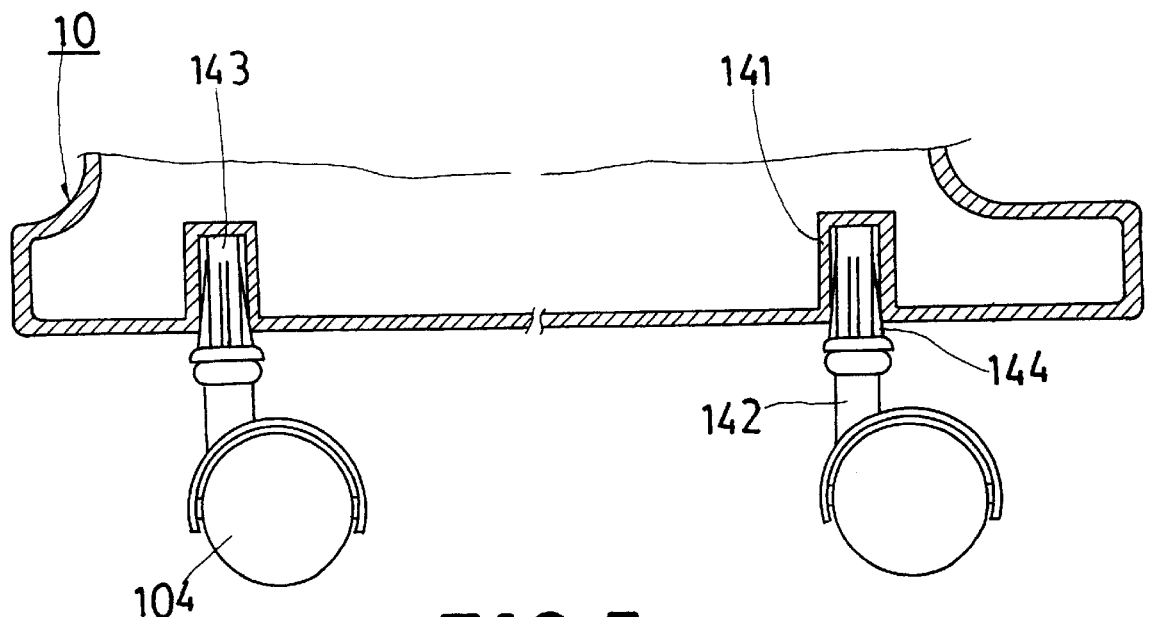
FIG. 7 is a schematic view showing the base plate and the rollers of the movable storage cabinet of the present invention after assembling.

Referring now to FIG. 6 and 7, the rollers 104 provided on the bottom of the base plate 10 can also be easily assembled in practice. That is, the four corners on the bottom of the base plate 10 are drilled to form four insertion holes 141, the rollers 104 are provided on the tops thereof with fixing posts 142 extending upwardly, and the fixing posts 142 are enveloped with rubber or plastic sleeves 143 on which a plurality of ribs 144 are provided. The largest diameter on the sleeves 143 is slightly larger than that of the insertion holes 141. The fixing posts 142 are pressed into the insertion holes 141 together with their sleeves 143, thereby secured the rollers 104, the rollers 104 can be taken off when a force larger than the friction force between the sleeves 143 and the insertion holes 141 is exerted on the rollers 104.

The above-described structure does not require any tool in Assembling can rather proceed with fast speed, and working hours can be saved. By virtue of the easy assembly of the structure, a manufacturer does not have to assemble it before storing or shipping, which can lower its cost, and customers can do the assembling work by themselves after they buy the components thereof in an unassembled state and with lower cost as well as with reduced volume, thereby eliminates the defects of the conventional structure.

Figure 8:
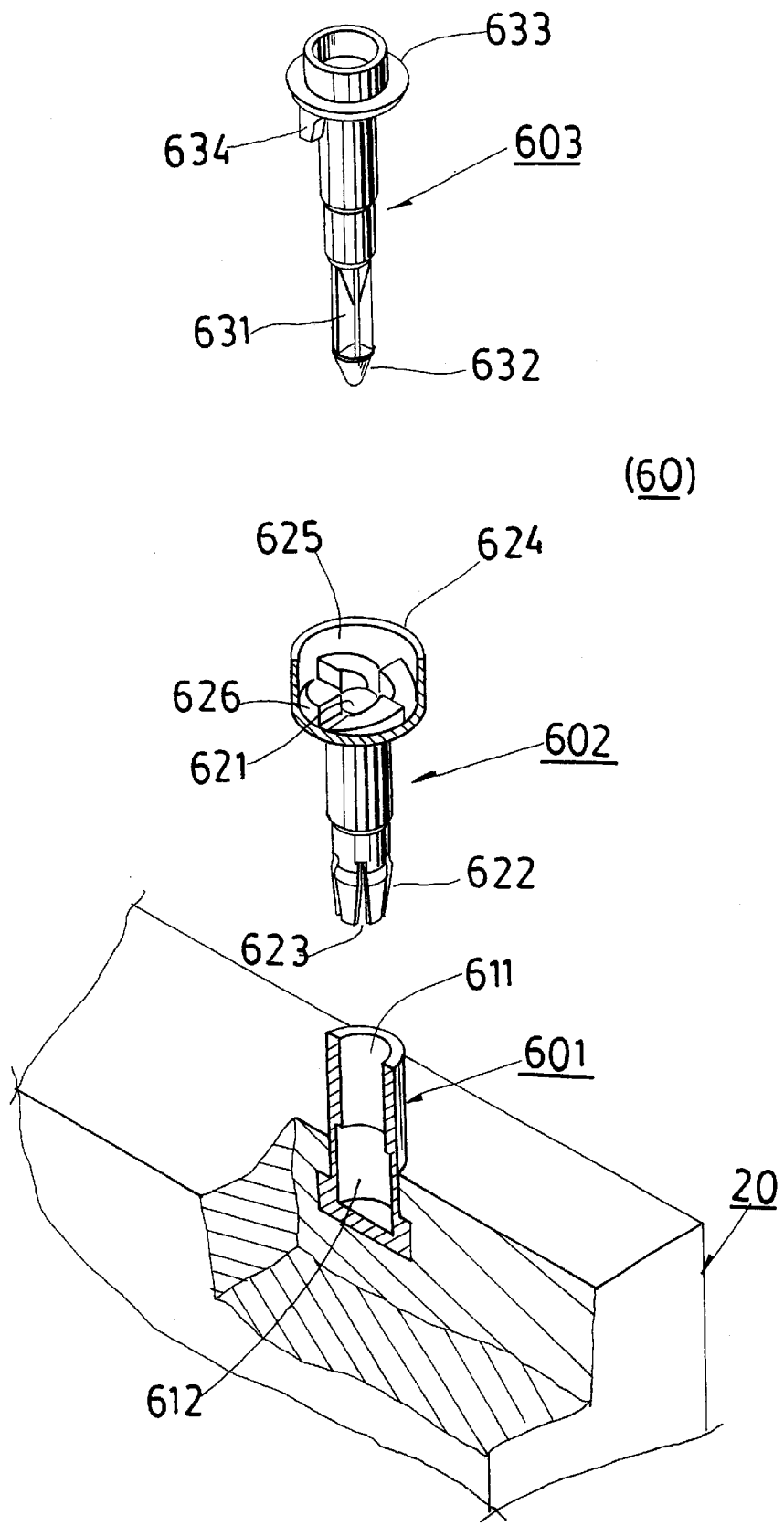
FIG. 8 is a partial exploded and analytic perspective view of the engagement component structure of the present invention.
Figure 9:
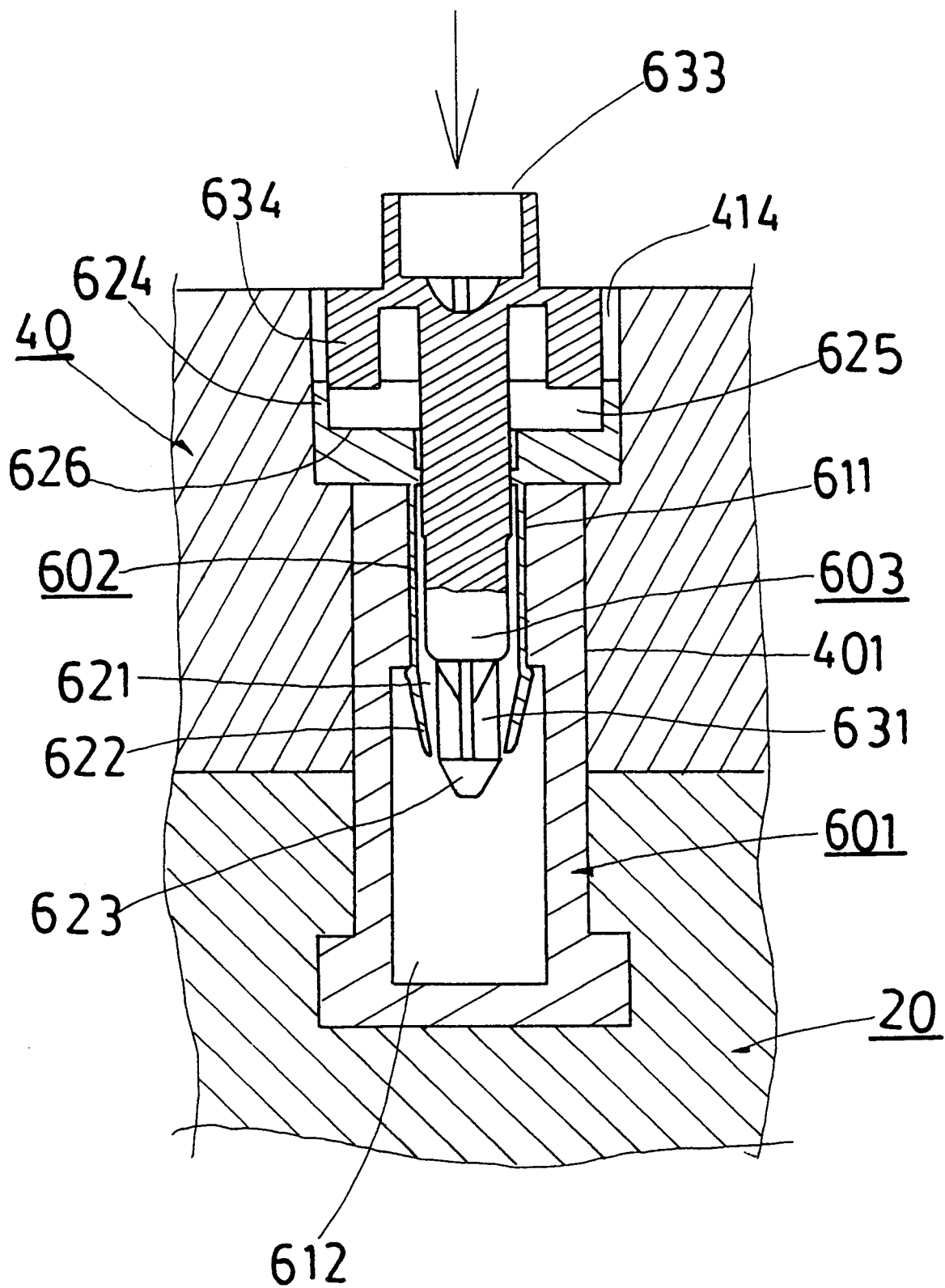
FIG. 9 is a schematic sectional view showing engaging of the engagement component structure of the present invention.

As shown in FIG. 8 and 9, the present invention is further characterized in the design of the engaging components 60 which are each comprised of an engaging stub 601, an outer sleeve 602 and a positioning rod 603, wherein:

The engaging stub 601 is in the shape of a hollow cylinder, the bottom of which is secured on the first object to be engaged with (either of the side plates 20), the top end thereof is aligned with a through hole 401 provided on the second object to be engaged with (the top plate 40, as shown in FIG. 9), and the central hole 611 thereof is enlarged at the lower portion 612 thereof.

The outer sleeve 602 is in the shape of a hollow cylinder with a central through hole 621, the shank thereof being inserted into the central hole 611 of an engaging stub 601, the tailing end of sleeve 602 is a claw 622 and is extended to the enlarged lower portion 612 of the central hole 611 of the engaging stub 601. The claw 622 is in the form of a hollow cone with a plurality of gaps 623 cut on the periphery thereof to stretch or collapse it elastically. The upper end of the claw 622 is slightly protruded externally to have a slightly larger diameter than the inner diameter of the central hole 611 of the engaging stub 601, the outer sleeve 602 is provided on its top with an enlarged portion 624 having a diameter larger than that of one of the above mentioned through hole 401, and a top round recess 625 is formed therein, the bottom of the round recess 625 being provided with a plurality of bevelled blocks 626 separately arrayed around the central through hole 621.

The positioning rod 603 has a length longer than that of the outer sleeve 602 and can be inserted into the central through hole 621 of the outer sleeve 602, the trailing end thereof being provided with a neck 631 with a smaller diameter. A cone 632 is provided on the end of the neck 631, the diameter of the upper end of the cone 632 being larger than the inner diameter of the bottom end of the claw 622. The top end of the positioning rod 603 is provided with a pressing member 633 of which the bottom end can be extended into the round recess 625, the bottom end of the pressing member 633 being provided with a plurality of guiding blocks 634 opposite to the bevelled blocks 626.

Figure 10:
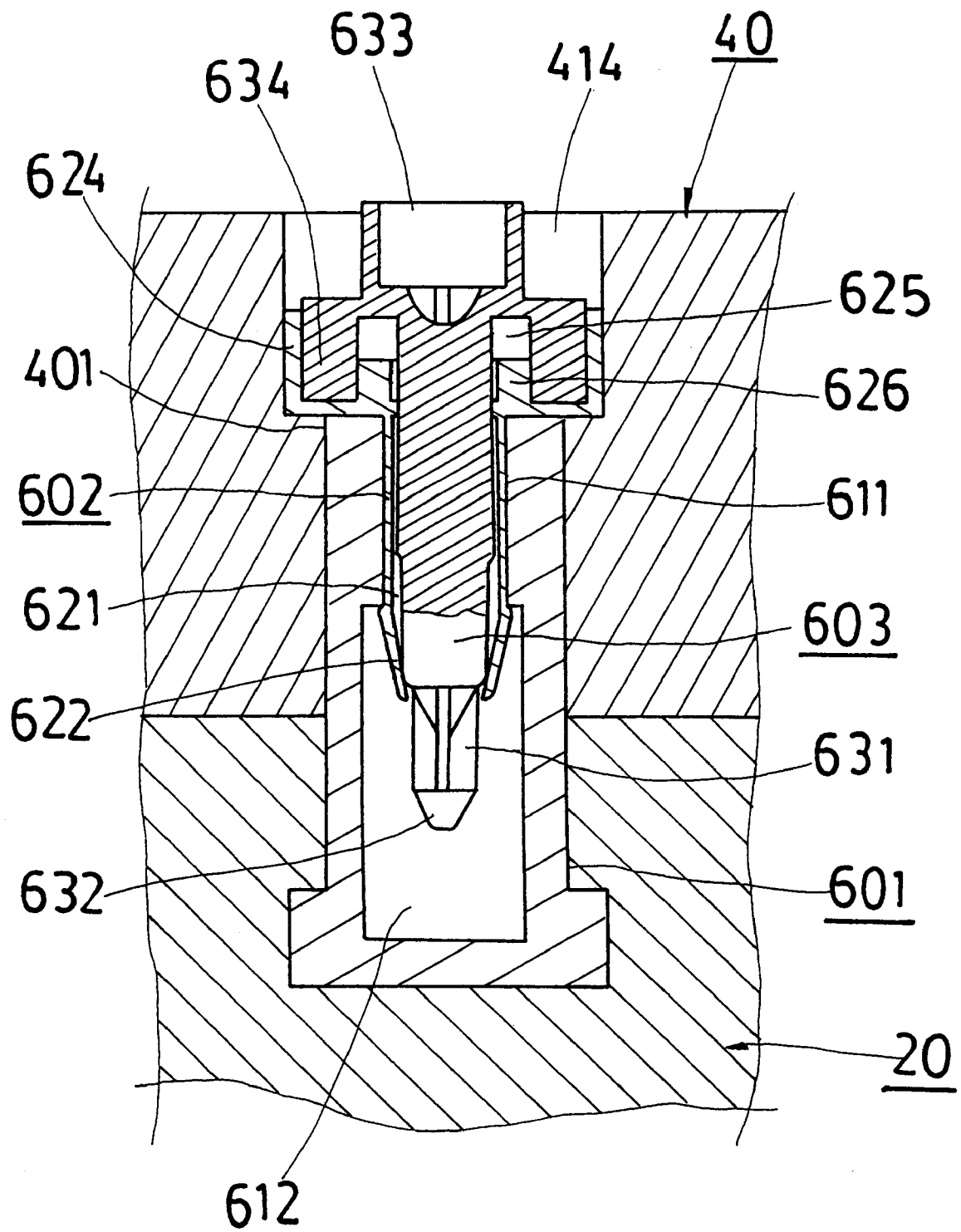
FIG. 10 is a lataeral sectional view showing the engagement component structure of the present invention after engagement.

Referring to FIG. 9 and 10, when the outer sleeve 602 is inserted in the central hole 611 of an engaging stub 601, the claw 622 will be contracted firstly, and when the outer sleeve 602 passes the enlarged lower portion 612, it can be stretched out elastically, and thus engaging state is obtained, the positioning rod 603 is extended into the central through hole 621 of the outer sleeve 602 and the pressing member 633 is pressed down. When the bottom ends of the guiding blocks 634 abut the bottom of the round recess 625 (FIG. 10), the neck 631 and the cone 632 are extended out of the bottom end of the claw 622 of the outer sleeve 602, and the end of the positioning rod 603 contacts the inner bottom end of the claw 622. In this way, the claw 622 is pushed outwardly slightly to prevent it from contracting, and the outer sleeve 602 locks the engaging stub 601 and can not be taken out. Because that the engaging stub 601 is secured on the first object to be engaged with (either of the side plates 20), while the top enlarged portion 624 thereof is above the through hole 401 provided on the second object to be engaged with (the top plate 40, as shown in FIG. 9), the side plate 20 and the top plate 40 (the first and the second objects) are connected with each other. In order that the enlarged portion 624 does not extended out of the top of the top plate 40 and thus adversely influence the aesthetical appearance, the inner diameter on the top of the through hole 401 can be enlarged to form a receiving groove 414, so that the enlarged portion 624 can be embedded in the receiving groove 414.

Figure 11:
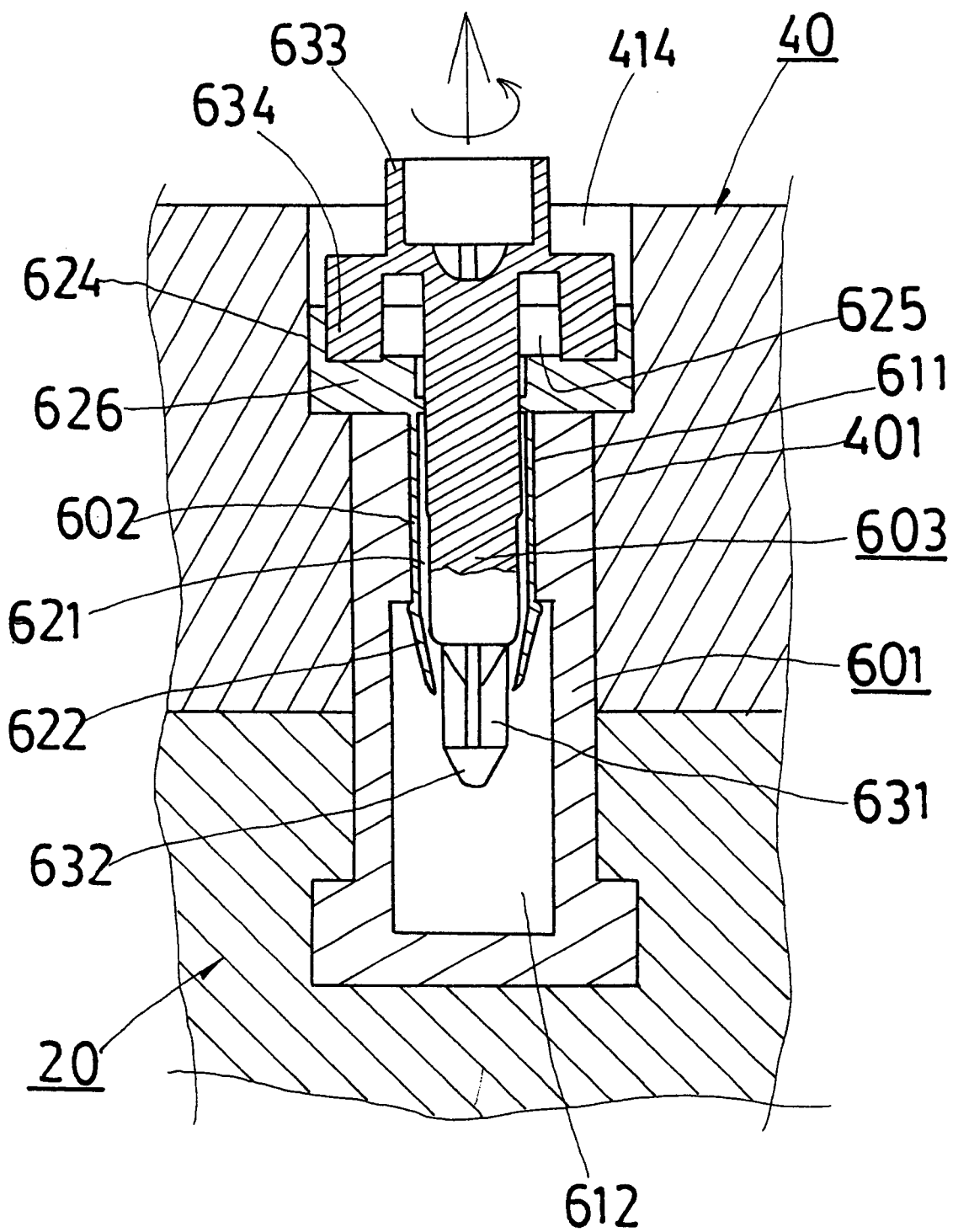
FIG. 11 is a schematic sectional view showing the first step in disengagement of the engagement component structure of the present invention.
Figure 12:
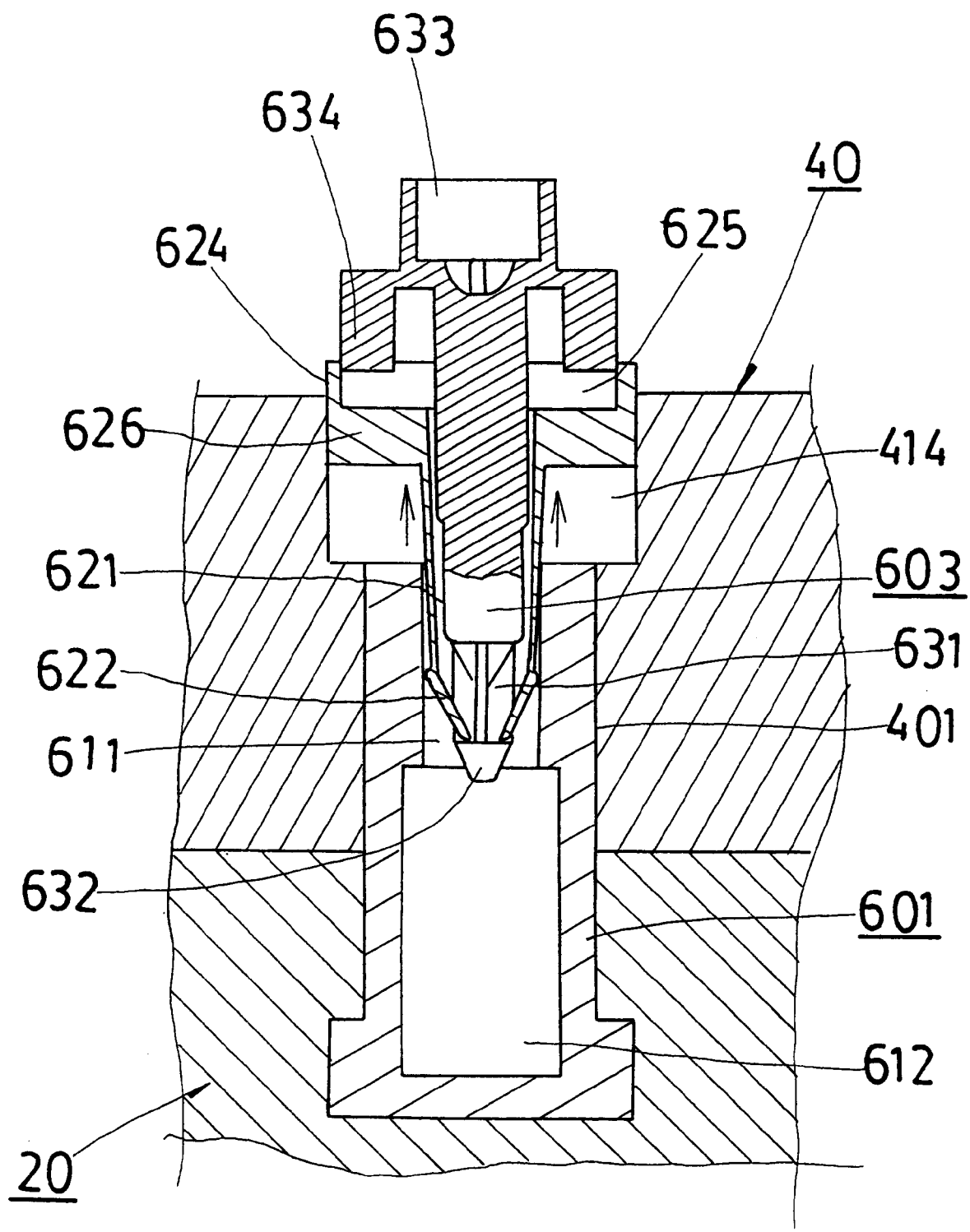
FIG. 12 is a schematic sectional view showing the second step in disengagement of the engagement component structure of the present invention.

Referring to FIG. 11 and 12, when the pressing member 633 is exerted with a force to rotate the positioning rod 603, the guiding blocks 634 are moved upwardly along the top surfaces of the bevelled blocks 626, and in turn the positioning rod 603 and the pressing member 633 are moved upwardly. Then, the end of the claw 622 of the outer sleeve 602 reaches the neck 631 of the positioning rod 603 having a reduced diameter, and the pressing member 633 is grasped and pulled upwardly so that, the end of the claw 622 is abutted against the upper surface of the cone 632 and thus is pulled upwardly together with the positioning rod 603, the peripheral surface of the claw 622 is pressed by the central hole 611 of the engaging stub 601, so that the outer sleeve 602 and the positioning rod 603 in the central through hole 621 thereof can be drawn upwawdly out of the central hole 611, and disengaging of the engaging component 60 can be effected, and the side plates 20 and the top plate 40 (the first and the second objects to be engaged with) then being separated. Further, the pressing member 633 can be provided on the top surface thereof with a narrow recess of the shape of "–" or "+", so that a screw driver with the end in the shape of "–" or "+" can be used to rotate the pressing member 633. For disassembly, the pressing member 633 can be totally embedded in the the round recess 625 when the engaging component 60 is in its complete engagement state, avoid a collision and enhance appearance.

The names of the members composing the present invention and the embodiments shown in the drawings are only for illustrating the present invention, and not for giving any limitation to the scope of the present invention. It will be apparent to those skilled in this art that various modifications or changes can be made to the elements of the present invention without departing from the spirit and scope of this invention. Accordingly, all such modifications and changes also fall within the scope of the appended claims and are intended to form part of this invention.

I claim:
1. A movable storage cabinet, comprising:
   a base plate having a top surface with two lateral sides, a rear side, and a front side, the two lateral sides of the top surface including positioning holes, the rear side of the top surface including a transverse groove, and two ends of the front side of the top surface including a pair of lower axle holes;
   two lateral side plates located upright respectively at said two lateral sides of the top surface of said base plate, two downwardly bent hooks being provided on the two lateral side plates at positions corresponding to positions of said positioning holes for engagement and fixing therewith, a vertical groove being provided on a rear end of each of said side plates and located above said transverse groove, and a plurality of engaging stubs being provided on respective tops of said two lateral side plates;
   a rear backing plate having two lateral ends arranged to engage said vertical grooves of said two lateral side plates, a bottom edge of said rear backing plate being inserted in said transverse groove of said base plate for securing said rear backing plate to said base plate;
   a top plate covering a top of said rear backing plate and said tops of said two lateral side plates, a pair of upper axle holes being provided in the top plate in correspondence with said lower axle holes, and a plurality of through holes corresponding to said engaging stubs also being provided in said top plate; and
   a plurality of engagement components extending downwardly through said through holes from above said top plate to engage with said engaging stubs for securing said top plate to said lateral side plates and said rear backing plate; and
   two door panels provided at two lateral ends of front edges of said top plate and said base plate to cover an area in front of said lateral side plates, a plurality of protruding axles being provided in correspondence with said upper and lower axle holes, so that said door panels are pivotally mounted for opening or closing.

2. A movable storage cabinet as claimed in claim 1, wherein:
   a thickness of an engaging portion at one lateral side of each of said positioning holes on said base plate is slightly larger than a height of engaging spaces above each of said hooks of the side plates, whereby when said movable storage cabinet is assembled, said side plates are placed at the lateral sides of said base plate, said hooks are inserted into said positioning holes, said side plates are tapped to move said side plate and cause said hooks to engage respective bottoms of said thicker engaging portions, thereby snugly engaging said hooks in said engaging portions.

3. A movable storage cabinet as claimed in claim 1, wherein:
   a plurality of protrusions are provided on inner surfaces of said side plates, said protrusions being arrayed in upper and a lower lines parallel to each other on both of said side plates, whereby when a transverse partitioning plate is inserted between said protrusions from the front or the rear of said two side plates and fixed therebetween, a space between said two side plates is divided into an upper and a lower area.

4. A movable storage cabinet as claimed in claim 1, wherein:
   four corners on the bottom of the base plate include four insertion holes, and rollers are provided on the tops thereof with fixing posts extending upwardly, said fixing posts being enveloped in rubber or plastic sleeves on which a plurality of ribs are provided, a largest diameter of said sleeves being slightly larger than that of said insertion holes, said fixing posts being pressed into said insertion holes together with their sleeves, said rollers thereby being secured on said base plate.

* * * * *